United States Patent [19]

Hunger

[11] 4,169,830
[45] Oct. 2, 1979

[54] DIAMINO-BENZANILIDE DISAZO COLORING AGENTS

[75] Inventor: Klaus Hunger, Kelkheim, Fed. Rep. of Germany

[73] Assignee: Hoechst Aktiengesellschaft, Frankfurt am Main, Fed. Rep. of Germany

[21] Appl. No.: 850,464

[22] Filed: Nov. 10, 1977

[30] Foreign Application Priority Data

Nov. 13, 1976 [DE] Fed. Rep. of Germany ....... 2651919

[51] Int. Cl.² ...................... C09B 33/12; D06P 1/04; D06P 1/44
[52] U.S. Cl. ...................................... 260/157; 106/23; 106/288 Q; 106/308 Q; 260/37 R; 260/762; 260/764
[58] Field of Search .................... 260/157; 106/288 Q, 106/308 Q

[56] References Cited

U.S. PATENT DOCUMENTS

| | | | |
|---|---|---|---|
| 3,956,266 | 5/1976 | Hunger et al. | 260/157 |
| 4,005,068 | 1/1977 | Mory et al. | 260/157 |

FOREIGN PATENT DOCUMENTS

| | | | |
|---|---|---|---|
| 1275233 | 3/1969 | Fed. Rep. of Germany | 260/160 |
| 1808017 | 6/1970 | Fed. Rep. of Germany | 260/157 |
| 2236250 | 3/1973 | Fed. Rep. of Germany | 260/176 |
| 41-2190 | 2/1966 | Japan | 260/157 |
| 210217 | 1/1924 | United Kingdom | 260/176 |
| 1266615 | 3/1972 | United Kingdom | 260/157 |

*Primary Examiner*—Floyd D. Higel
*Attorney, Agent, or Firm*—Curtis, Morris & Safford

[57] ABSTRACT

Disazo compounds, obtained by diazotizing 4,4′-diaminobenzanilide and coupling it to one or more acetoacetyl benzimidazolones, are valuable pigments of good dispersibility, tinctorial strength, fastness to light, weathering, solvents and migration.

8 Claims, No Drawings

DIAMINO-BENZANILIDE DISAZO COLORING AGENTS

The present invention relates to disazo compounds, a process for preparing them and their use as coloring agents.

In German Offenlegungsschrift No. 2,236,250, disazo compounds have been described which are derived from 4,4'-diamino-benz-anilide as bisdiazo component and from identical or different coupling components of the acylacetoaryl series. However, only acetoacetylanilide derivatives have been described in detail.

The present invention provides disazo compounds of the formula

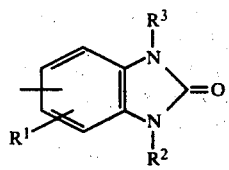

in which R and R', which may be identical or different, stand for benzimidazole radicals of the formula

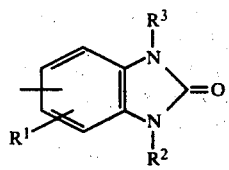

in which $R^1$ stands for hydrogen, chlorine, bromine, methyl or methoxy, and one of the radicals $R^2$ and $R^3$ stands for hydrogen and the other for hydrogen, methyl or ethyl.

Preference is given to disazo compounds of the formula

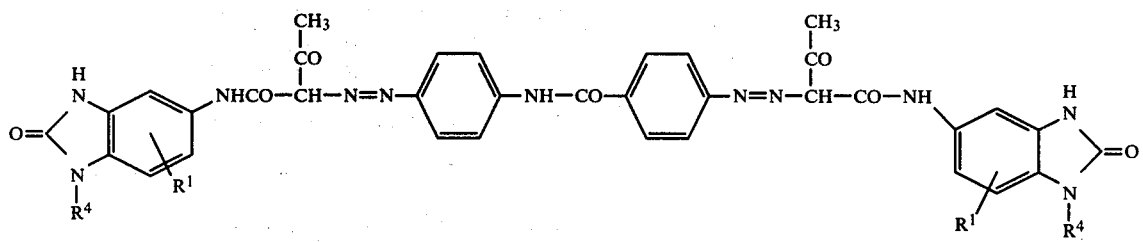

in which $R^1$ is defined as above and $R^4$ stands for hydrogen, methyl or ethyl.

A special embodiment of the invention comprises compounds in which at least one of the radicals $R^1$, $R^2$ and $R^3$ is other than hydrogen.

The invention relates also to a process for the preparation of the above-mentioned disazo compounds, which comprises bisdiazotizing 4,4'-diamino-benzanilide and combining the bisdiazonium compound thus obtained with 2 equivalents of a coupling component of the formula

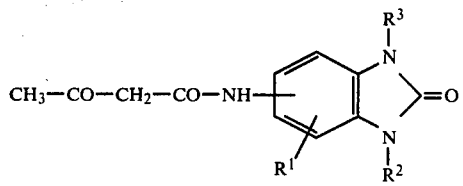

in which $R^1$, $R^2$ and $R^3$ are defined as above, for example, in an aqueous medium.

In this process a single coupling component or a mixture of two or several coupling components may be used.

Moreover, the invention comprises the use of the disazo compounds of the invention as coloring agents, especially as pigments.

The bisdiazotization of the diamine may be effected, for example, with alkali metal nitrites or lower alkyl nitrites with sufficiently strong acids, especially a mineral acid, but also with nitrosyl-sulfuric acid. It may be advantageous to add in this process, and also in the following coupling step, a surface-active agent, such as non-ionogenic, anionic or cationic dispersing agents.

The diazotization and coupling processes may also be carried out in the presence of appropriate organic solvents, for example glacial acetic acid, lower alkanols, dioxan, formamide, dimethylformamide, dimethylsulfoxide, pyridine or N-methyl-pyrrolidone. In order to obtain the full color depth and a particularly favorable crystal structure, it is often suitable to heat the coupling mixture for some time, for example to boil the same or to maintain it at a temperature of more than 100° C. under pressure, optionally in the presence of an organic solvent, for example, lower alkanols, such as ethanol, halogenated aromatic compounds, such as chlorobenzene or dichlorobenzenes- for example o-dichlorobenzene-, dimethylformamide, or in the presence of resin soap. Particularly pure pigments of high tinctorial strength are obtained with the products of the invention, if the moist press cakes or the dried powders are subjected after the coupling to a thermal after-treatment with organic solvents, such as alcohols, above all lower alkanols, pyrindine, glacial acetic acid, dimethylformamide, N-methylpyrrolidone, dimethylsulfoxide, halogenated aromatic compounds, such as chlorobenzene or dichlorobenzenes, for example, o-dichlorobenzene or nitrobenzene, or a grinding of the pigments is subsequently effected, while adding grinding auxiliaries.

The term "lower" in connection with alkyl radicals comprises groups having from 1 to 6, especially from 1 to 4 carbon atoms.

The pigments may also be prepared in the presence of a carrier material, for example heavy spar.

The novel compounds are water-insoluble and are insoluble in the common organic solvents; they are suitable for the pigmenting of printing inks, color lakes and dispersion paints, for the dyeing of rubber, plastic materials and natural or synthetic resins. The are also suitable for the pigment printing on substrates, especially textile fiber materials or other flat articles, such as paper.

The pigments may also be used in other fields of application, for example in a finely divided form for the dyeing of rayon made of viscose or cellulose ethers and/or esters, polyamides, polyurethanes, polyglycolterephthalates or polyacrylonitriles in the spinning solution, or for the dyeing of paper.

The pigments can be easily processed in the above-specified media. The dyeings show a very high color intensity and fastness to light and are resistant to the influence of chemical agents, above all solvents. As compared with the closely comparable pigments specified in German Offenlegungsschriften Nos. 2,236,250 and 2,228,873, the pigments of the invention show a considerably better fastness to overvarnishing in lacquers and fastness to bleeding in plastics, as well as an improved fastness to light.

The following Examples serve to illustrate the invention. The percentages relate to the weight, and the temperatures are indicated in degrees Celsius (centigrade).

EXAMPLE 1

11.4 Grams of 4,4'-diaminobenzanilide are stirred with 150 ml of water and 30 ml of 31% hydrochloric acid for 30 minutes. Upon heating to 80° C the hydrochloride is dissolved. The mixture is cooled to 0° C. and the diazotization is effected by rapidly introducing 13.1 ml of a 40% sodium nitrite solution below the surface of the solution. Stirring of the mixture is continued for 1 hour at 0° C., then 1 g of kieselguhr and 1 g of bleaching clay are added, and the diazonium salt solution is clarified.

24 Grams of 5-acetoacetylaminobenzimidazolone are dissolved in 200 ml of water and 18 ml of 33% sodium hydroxide solution, and the solution is clarified with 2 g of kieselguhr. Subsequently 20 ml of a 10% aqueous solution of a stearyl alcohol oxethylated with 20 moles of ethylene oxide are added, then the mixture is cooled to 10° C., and the 5-acetoacetylamino-benzimidazolone is rapidly precipitated with a solution of 12 ml of glacial acetic acid in 60 ml of water.

The diazonium solution is then introduced within one hour, while stirring, below the surface of the suspension of the coupling component. Stirring of the mixture is continued for 1 hour, the mixture is then heated to 95° C., and the yellow precipitate obtained is filtered off with suction. Upon washing with water and drying, 37 g of a product are obtained which is heated in 500 ml of dimethylsulfoxide for 2½ hours at 150° C. After cooling, the product is filtered off with suction, is washed with methanol and water and dried.

If 4.5 g of the pigment obtained according to Example 1 are mixed with 25.5 g of a grinding vehicle consisting of a 20% solution of alkyd resin lacquer in xylene shaken on a vibration ball mill for 45 minutes, with 60 g of a clear lacquer consisting of 52.5 g of a 70% alkyd resin solution in xylene, with 35 g of a 55% melamine resin solution in butanol, and with 2.5 g of butylgylcol, 5 g of butanol and 5 g of mineral spirit, a yellow-colored full shade lacquer is obtained which, when sprayed onto an aluminum sheet and stoved for 30 minutes at 140° C., yields a yellow dyeing having an acceptable fastness to overvarnishing and a good fastness to light and weathering.

EXAMPLE 2

11.4 Grams of 4,4'-diaminobenzanilide are bisdiazotized according to the method described in Example 1.

28 Grams of 5-acetoacetylamino-6-chlorobenzimidazolone are dissolved in 200 ml of water and 18 ml of 33% sodium hydroxide solution, then a small amount of active charcoal is added, and the solution is clarified.

For the coupling, 300 ml of ice water, 20 ml of a 10% aqueous solution of a stearyl alcohol oxethylated with 20 moles of ethylene oxide, 12 ml of glacial acetic acid and 25 ml of a 4 N sodium acetate solution are introduced into a vessel. The mixture is cooled to 10° C., and the diazonium salt solution prepared according to Example 1 as well as the clarified solution of 5-acetoacetylamino-6-chlorobenzimidazolone are simultaneously added dropwise to the mixture within one hour. Stirring of the mixture is continued for 1 hour, the mixture is heated to 95° C., and the reddish-yellow precipitate is filtered off with suction after 15 minutes at this temperature. Said precipitate is washed with water and dried. Afterwards the crude product is treated for 25 minutes with 500 ml of dimethylformamide at 145° C. It is filtered off with suction, is washed with methanol and water and dried. Yield: 35.5 g of pigment. When mixing 67 g of polyvinyl chloride, 33 g of a plasticizer mixture (mixture of equal parts of dioctyl phthalate and dibutyl phthalate), 0.1 g of the pigment according to Example 2 and 0.5 g of titanium dioxide for 15 minutes at 150° C. on a roller mill and processing the mixture into a sheet, the yellow color shade thereof is marked by a high color intensity and purity of shade, as well as by a good fastness to light and migration.

In a manner analogous to that described in Examples 1 and 2, the following further pigments with 4,4'-diaminobenzanilide as diazo component are obtained:

| Ex. | Coupling component | Color shade |
|---|---|---|
| 3 | 5-acetoacetylamino-7-chlorobenzimidazolone | reddish-yellow |
| 4 | 5-acetoacetylamino-6-methylbenzimidazolone | orange |
| 5 | 5-acetoacetylamino-7-methylbenzimidazolone | reddish-yellow |
| 6 | 5-acetoacetylamino-7-methoxybenzimidazolone | orange |
| 7 | 5-acetoacetylamino-6-bromobenzimidazolone | yellow |
| 8 | 5-acetoacetylamino-7-bromobenzimidazolone | reddish-yellow |
| 9 | 5-acetoacetylamino-6-methoxybenzimidazolone | reddish-yellow |
| 10 | 5-acetoacetylamino-1-methylbenzimidazolone | reddish-yellow |
| 11 | 5-acetoacetylamino-1-ethylbenzimidazolone | reddish-yellow |

I claim:
1. A compound of the formula

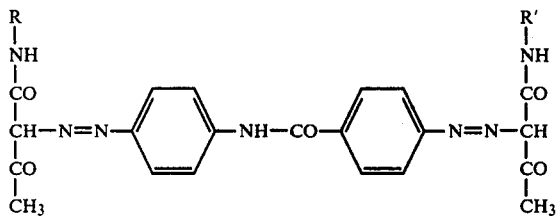

in which R and R', which are the same or different, are

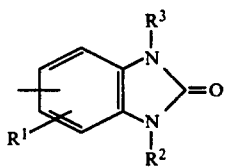

wherein $R^1$ is hydrogen, chlorine, bromine, methyl or methoxy and one of the substituents $R^2$ and $R^3$ is hydrogen and the other is hydrogen, methyl or ethyl.

2. A compound as claimed in claim 1, wherein R and R' are identical.

3. A compound as claimed in claim 1, wherein R and R' are

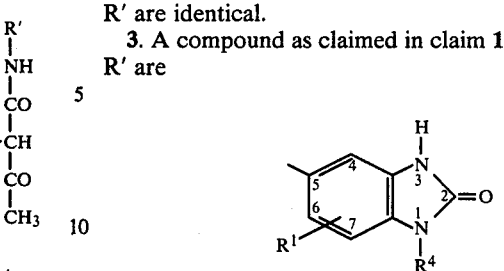

in which formula $R^1$ is as defined in claim 1 and $R^4$ is hydrogen, methyl or ethyl.

4. A compound as claimed in claim 3, wherein $R^4$ is hydrogen.

5. The compound as claimed in claim 4, wherein $R^1$ and $R^4$ are hydrogen.

6. The compound as claimed in claim 4, wherein $R^1$ is chlorine in 7-position.

7. The compound as claimed in claim 4, wherein $R^1$ is methyl in 7-position.

8. A compound as claimed in claim 1 wherein at least one of $R^1$, $R^2$ and $R^3$ is other than hydrogen.

* * * * *